United States Patent
Iwasaki

(12) 
(10) Patent No.: US 6,843,211 B2
(45) Date of Patent: Jan. 18, 2005

(54) WATER-COOLED TYPE ENGINE COOLING APPARATUS AND TRANSMISSION OIL COOLER MODULE

(75) Inventor: Mitsuru Iwasaki, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 21 days.

(21) Appl. No.: 10/397,835

(22) Filed: Mar. 27, 2003

(65) Prior Publication Data

US 2003/0217707 A1 Nov. 27, 2003

(30) Foreign Application Priority Data

Mar. 27, 2002 (JP) .................................... P2002-089120
Mar. 27, 2002 (JP) .................................... P2002-089121

(51) Int. Cl.[7] ................................................ F01P 1/06
(52) U.S. Cl. ................................... 123/41.31; 165/287
(58) Field of Search .......................... 123/41.31, 41.33; 165/280, 287, 292, 293, 296, 297, 299

(56) References Cited

U.S. PATENT DOCUMENTS 6,053,131 A * 4/2000 Mueller et al. .......... 123/41.31
6,196,168 B1 * 3/2001 Eckerskorn et al. ..... 123/41.33
6,349,680 B1 * 2/2002 Wolter et al. ............ 123/41.31

FOREIGN PATENT DOCUMENTS

| JP | 60-80093 A | 5/1985 |
| JP | 4-41972 U | 4/1992 |
| JP | 4-109027 A | 4/1992 |
| JP | 6-272558 A | 9/1994 |
| JP | 7-26955 A | 1/1995 |
| JP | 3183584 B2 | 4/2001 |

* cited by examiner

Primary Examiner—Noah P. Kamen
(74) Attorney, Agent, or Firm—Foley & Lardner LLP

(57) ABSTRACT

A water-cooled type engine cooling apparatus includes: an oil cooler that circulates cooling water flowing out of a water-cooled type engine; a water temperature detection unit that detects temperature of the cooling water; a switching unit that switches the oil cooler from an operating state to a halt state, and vice versa; and a switching control unit that controls switching of the switching unit. The switching control unit controls the switching unit to switch the oil cooler into the halt state when the temperature detected by the water temperature detection unit is lower than a preset temperature, and controls the switching unit to switch the oil cooler into the operating state when the temperature detected by the water temperature detection unit is not lower than the preset temperature.

12 Claims, 9 Drawing Sheets

WATER-COOLED TYPE ENGINE COOLING APPARATUS AND TRANSMISSION OIL COOLER MODULE

The present disclosure relates to the subject matter contained in Japanese Patent Application No. 2002-089120 filed on Mar. 27, 2002, and in Japanese Patent Application No. 2002-089121 filed on Mar. 27, 2002, which are incorporated herein by reference in its entirety.

BACKGROUND OF THE INVENTION

1. Field of the Invention

The present invention relates to a water-cooled type engine cooling apparatus, and also relates to a transmission oil cooler module for regulating the temperature of hydraulic oil for a transmission to a preset temperature due to heat exchange with the water temperature of cooling water flowing out of a water-cooled type engine.

2. Description of the Related Art

As a water-cooled type engine cooling apparatus, a technique disclosed in JP-UM-A-4-041972 (1992) is known in the related art. In the water-cooled type engine cooling apparatus disclosed in this official gazette, an oil cooler and an air conditioner are provided. The oil cooler heats and cools hydraulic oil for a transmission by use of cooling water for an engine. The air conditioner conditions the air in a cabin. Thus, even when the temperature of the hydraulic oil is low, for example, just after the start-up of the engine, the hydraulic oil is heated by the oil cooler so that proper viscosity can be secured in the hydraulic oil while friction loss in the automatic transmission can be reduced. Thus, fuel economy is improved in a vehicle.

However, the related art has problems as follows. That is, the hydraulic oil for the automatic transmission does not drop very much in spite of continuous stop of the engine in a season with a good climate such as spring or autumn. Further, when the air conditioner is used, the difference between target temperature to be set by a passenger and outdoor air temperature is so small that the fuel economy can be improved even if the air conditioner is operated while the hydraulic oil is heated by use of the cooling water. However, in an environment such as winter, in which the outdoor air temperature is very low, the hydraulic oil for the automatic transmission becomes very low in temperature due to continuous stop of the engine. Further, the difference between the target temperature and the outdoor air temperature increases. As a result, when heating of the hydraulic oil and heating of the air in the cabin are performed simultaneously, increase in the energy used for heating the hydraulic oil results in reduction in the heating performance of the air conditioner. Thus, there is a problem that it takes much time to attain the target temperature.

In addition, it is a well-known fact that when the engine is operated at a temperature as high as possible, the friction loss of the engine itself is reduced so that the fuel economy is improved. In order to accelerate warming-up of the engine when starting up from a cold state, control is typically made to increase fuel oil consumption at idling time till the temperature of the engine reaches predetermined temperature (hereinafter referred to as "warming-up control temperature"). Therefore, when heating of the hydraulic oil and heating of the air are performed together in the circumstances that the outdoor air temperature is low, there occurs a delay in increasing the temperature of the cooling water to the warming-up control temperature. Thus, there is a problem that the fuel economy is deteriorated.

In order solve these problems, there is provided a transmission oil cooler in which a bypath and a valve are provided in an oil circuit for circulating hydraulic oil for a transmission through the oil cooler so that the valve opens the bypath when the temperature of the hydraulic oil is not higher than predetermined temperature, and the valve closes the bypath when the temperature of the hydraulic oil exceeds the predetermined temperature, as disclosed in JP-A-6-272558 (1994). That is, when the oil temperature is not higher than the predetermined temperature, the hydraulic oil is made to bypass the oil cooler through the bypath so as to avoid heat exchange with the cooling water and thereby accelerate the increase of the water temperature. Thus, the air conditioner is prevented from being degraded in its heating performance. When the oil temperature exceeds the predetermined temperature, the bypath is closed so that heat exchange between the hydraulic oil and the cooling water is carried out to increase the temperature of the hydraulic oil. Thus, the friction loss of the automatic transmission is reduced.

However, in the transmission oil cooler, avoidance and execution of heat exchange between the hydraulic oil and the cooling water are controlled in accordance with the temperature of the hydraulic oil. Thus, there is a problem that even when the cooling water temperature is lower than the warming-up control temperature, the heat exchange between the hydraulic oil and the cooling water is executed so that the temperature of the cooling water is prevented from increasing. Further, in the known example, cutting is required for the casing that forms the outer circumference of the valve. In addition, work of bolting or the like is also required for installing the oil cooler. Thus, there is a problem that it takes much labor for installation so that the cost is increased.

SUMMARY OF THE INVENTION

The invention was developed in consideration of such problems in the related art. It is an object of the invention to provide a water-cooled type engine cooling apparatus which has an oil cooler and an air conditioner and which can improve fuel economy without degrading the performance of the air conditioner even when there is a change in conditions such as outdoor air temperature.

It is another object of the invention to provide a transmission oil cooler module in which the improvement in fuel economy can be obtained to surpass the improvement in fuel economy due to the oil cooler increasing the temperature of hydraulic oil for an automatic transmission, while the number of man hours for installation can be reduced so that the cost can be reduced in comparison with a related-art oil cooler having a hydraulic oil bypass function.

In order to achieve the object, according to a first aspect of the invention, there is provided a water-cooled type engine cooling apparatus including: an oil cooler adapted to circulate cooling water flowing out of a water-cooled type engine so as to regulate temperature of hydraulic oil for an automatic transmission by exchanging heat of the hydraulic oil with heat of the cooling water; a water temperature detection unit adapted to detect temperature of the cooling water; a switching unit capable of switching the oil cooler from an operating state to a halt state, and vice versa; and a switching control unit adapted to control switching of the switching unit; wherein the switching control unit controls the switching unit to switch the oil cooler into the halt state when the temperature detected by the water temperature detection unit is lower than a preset temperature, and controls the switching unit to switch the oil cooler into the operating state when the temperature detected by the water temperature detection unit is not lower than the preset temperature.

In a water-cooled type engine cooling apparatus according to the first aspect of the invention, there is provided a switching unit which can switch an oil cooler from an operating state to a halt state and vice versa. Then, a switching control unit controls the switching unit as follows. That is, the switching control unit controls the switching unit to switch the oil cooler into the halt state when the temperature detected by the water temperature detection unit is lower than a preset temperature, and controls the switching unit to switch the oil cooler into the operating state when the temperature detected by the water temperature detection unit is not lower than the preset temperature. That is, when the temperature of the cooling water is lower than the preset temperature, increasing of the temperature of the cooling water to warming-up control temperature is accelerated. Thus, the engine is operated at a temperature as high as possible so that the friction loss of the engine itself is reduced while the increase control time of fuel oil consumption is shortened. As a result, the improvement in fuel economy obtained thus surpasses the improvement in fuel economy due to the oil cooler increasing the temperature of hydraulic oil for an automatic transmission. Particularly, it is possible to improve fuel economy at engine start time.

In addition, when the air conditioner has been switched on with the room temperature lower than target temperature, circulation of the cooling water through the oil cooler may be halted.

That is, in an environment such as winter, in which outdoor air temperature is very low, there is a large difference between target temperature in the cabin set by a passenger and the outdoor air temperature. Accordingly, when heating of the hydraulic oil and conditioning of the air are performed together, the energy used for heating the hydraulic oil is so great that the heating performance of the air conditioner is degraded, and hence it takes much time to attain the target temperature. However, when the temperature of the cooling water is lower than the preset temperature, the operation of the oil cooler is forbidden until the target temperature is attained. Consequently, there is no fear that the heating performance of the air conditioner is degraded. Thus, stable air conditioning can be attained.

Further, an air conditioning unit may be provided for circulating the cooling water through a tube. In this configuration, the circulation unit is controlled so that the liquidity of the cooling water in the tube is set within a range including at least one of a transition zone between a laminar flow zone and a turbulent flow zone and a turbulent flow zone adjacent to the transition zone. Thus, the heat exchange effectiveness of the air conditioner is enhanced so that the time required for attaining the target temperature can be shortened.

In addition, the switching unit may be made of a cooling water change-over valve for stopping circulating the cooling water through the oil cooler, or may be made of a hydraulic oil change-over valve for stopping circulating the hydraulic oil through the oil cooler. More specifically, the switching unit may be made of a thermostat for automatically changing over when the detected temperature of the cooling water reaches the preset temperature.

Further, there may be provided a hydraulic oil circulation path for circulating the hydraulic oil through the oil cooler; a hydraulic oil change-over valve including the thermostat; and a water temperature supply path for supplying water temperature of the cooling water to the thermostat included in the hydraulic oil change-over valve. In this configuration, the circulation of the hydraulic oil through the oil cooler is changed over by the switching control unit in accordance with the water temperature supplied from the water temperature supply path.

According to a second aspect of the invention, there is provided a transmission oil cooler module for regulating temperature of hydraulic oil for a transmission by exchanging heat of the hydraulic oil with heat of the cooling water flowing out of a water-cooled type engine, including: an oil cooler body adapted to circulate the hydraulic oil for the transmission; an introduction path adapted to introduce the cooling water into the oil cooler body separately from the hydraulic oil in a manner that the cooling water can exchange heat with the hydraulic oil; a discharge path adapted to discharge the cooling water to an outside of the oil cooler body; a bypath connecting the introduction path and the discharge path with each other and adapted to bypath the cooling water onto the oil cooler body; a water temperature detection unit adapted to detect water temperature of the cooling water; a switching unit capable of switching from a mode allowing the cooling water to circulate through the oil cooler body to a mode allowing the cooling water to bypass the oil cooler body through the bypath, and vice versa; and a switching control unit adapted to control switching of the switching unit; wherein the introduction path, the discharge path and the bypath are formed integrally with the oil cooler body, wherein the water temperature detection unit, the switching control unit and the switching unit are provided in an inside of one of the introduction path, the discharge path and the bypath, and wherein the switching control unit controls the switching unit to switch into halt state that the cooling water is halt to circulate through the oil cooler body when the water temperature detected by the water temperature detection unit is lower than a preset temperature, and controls the switching unit to switch into operating state that the cooling water circulate through the oil cooler body when the water temperature detected by the water temperature detection unit is not lower than the preset temperature.

In a transmission oil cooler module according to the second aspect of the invention, a switching unit is provided for switching from a operating state into a halt state and vice versa. Then, a switching control unit controls the switching unit as follows. That is, the switching control unit controls the switching unit to switch into halt state that the cooling water is halt to circulate through the oil cooler body when the water temperature detected by the water temperature detection unit is lower than a preset temperature, and controls the switching unit to switch into operating state that the cooling water circulate through the oil cooler body when the water temperature detected by the water temperature detection unit is not lower than the preset temperature. That is, when the water temperature is lower than the preset temperature, the increase of the water temperature is accelerated so that the engine is operated at a temperature as high as possible. As a result, the improvement in fuel economy obtained thus surpasses the improvement in fuel economy due to the oil cooler increasing the temperature of hydraulic oil for an automatic transmission. Particularly, it is possible to improve fuel economy at engine start time.

Further, in the transmission oil cooler module according to the invention, the introduction path, the discharge path and the bypath are formed integrally with the oil cooler body, and the water temperature detection unit, the switching control unit and the switching unit are provided in the inside of one of the introduction path, the discharge path and the bypath. Accordingly, the installation of the transmission oil cooler module into a transmission housing or the like can be completed only by fixing the oil cooler body thereto. Thus, in comparison with the related-art oil cooler having a cooling water bypass structure, the number of man hours for installation can be reduced so that the cost can be reduced.

In addition, the switching unit may be formed as a change-over valve located in a portion where one of the introduction path and the discharge path joins the bypath, so as to open the bypath while closing the one of the introduction path and the discharge path when detected water temperature is lower than temperature set in advance, and so as to close the bypath while opening the one of the introduction path and the discharge path when the detected water temperature is not lower than the temperature set in advance.

In addition, the water temperature detection unit, the switching control unit and the switching unit may be formed as a slide type change-over valve controlled by a thermostat. With such a configuration, the water temperature detection unit, the switching unit and the switching control unit are formed integrally so that the system can be miniaturized, and installed in the oil cooler easily.

Further, the introduction path, the discharge path and the bypath may be made of pipes projecting out from the oil cooler body. With such a configuration, the cooling water made to bypass the oil cooler body through the bypath can be prevented from being deprived of heat by the oil cooler body. Thus, the increase of the water temperature can be accelerated more.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, there is shown a preferred embodiment of the invention.

[First Embodiment]

Figure 1:
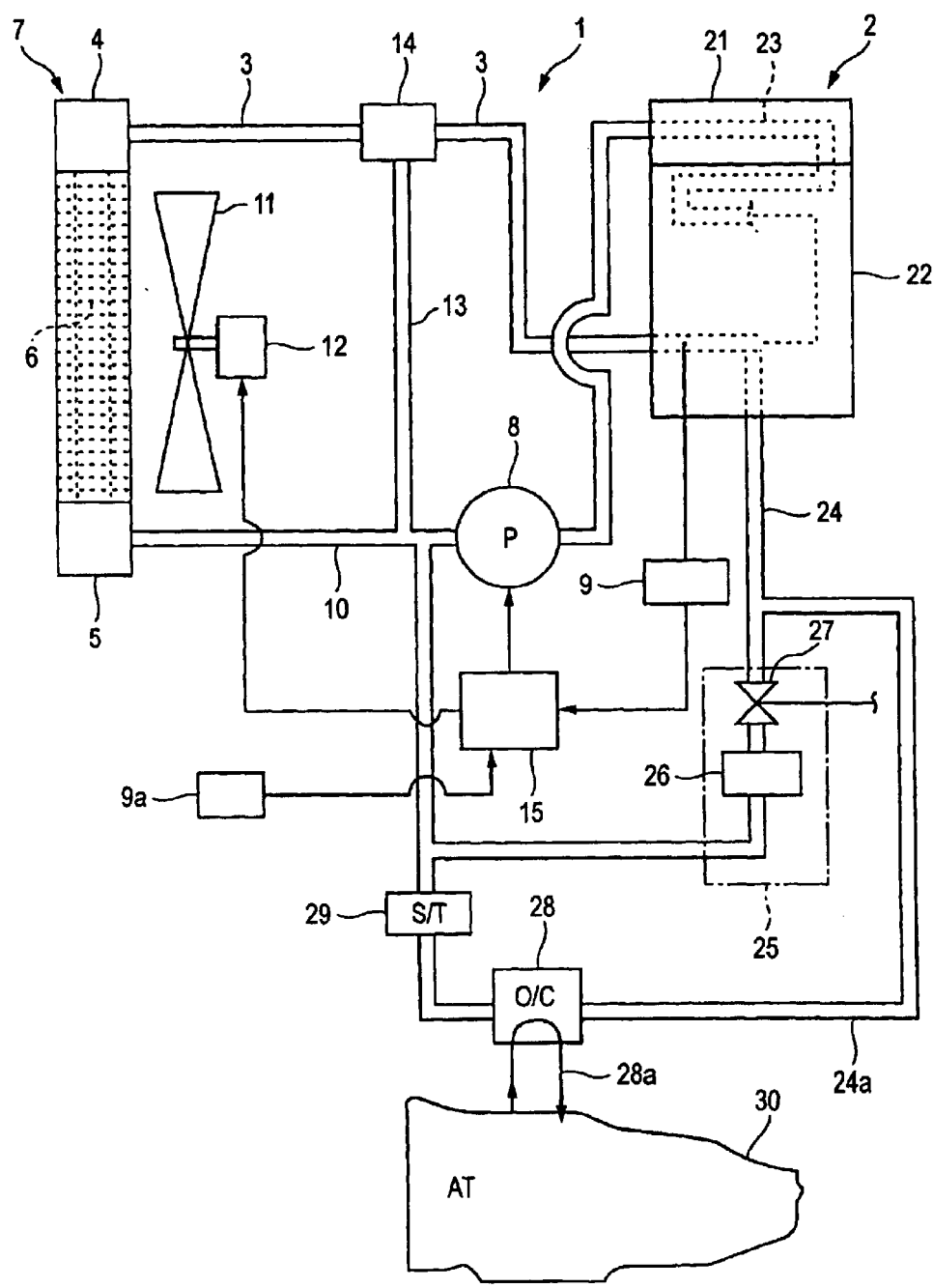
FIG. 1 is a schematic explanatory view showing a water-cooled type engine cooling system according to a first embodiment of the invention.

FIG. 1 is an explanatory diagram showing a water-cooled type engine cooling apparatus according to a first embodiment of the invention. As shown in FIG. 1, a cooling apparatus 1 according to the first embodiment has a radiator 7 provided as a heat exchanger.

In the radiator 7, cooling water flowing out of a water-cooled type engine (hereinafter referred to as "engine" simply) 2 through a cooling water circuit (cooling water circulation pipe) 3 is circulated through tubes 6 disposed between headers 4 and 5. Thus, the cooling water is cooled.

In addition, a motorized pump 8 is provided. The motorized pump 8 is driven independently of the engine 2 so as to circulate the cooling water through the engine 2 and the radiator 7. Although only the motorized pump 8 is used in the first embodiment, the invention is not limited to such a configuration. Another configuration may be adopted if the circulating volume of the cooling water can be regulated. For example, such a configuration may be adopted that a motorized pump used as a main-pump and an ordinary engine-driven water pump used as a sub-pump are combined to regulate the flow rate of the main-pump in accordance with the engine speed so as to regulate the total circulating volume of the cooling water.

In addition, there are provided a temperature sensor 9 as a temperature detection unit for detecting the temperature of the cooling water in the engine 2, and a room temperature sensor 9a for detecting the room temperature. Further, a cooling water circuit 10 is provided for distributing the cooling water from the radiator 7 to the engine 2 through the motorized pump 8 provided on the way. In addition, a rotary drive motor 12 with a fan 11 is provided for blowing the air to the tubes 6 of the radiator 7. In addition, an electrically controllable thermostat 14 is provided in the middle of the cooling water circuit 3. By the thermostat 14, the cooling water to be delivered from the engine 2 to the radiator 7 is bypassed to the suction side of the motorized pump 8 through a bypass circuit 13 in accordance with the temperature of the cooling water. In addition, a control unit 15 is provided for controlling the driving output of the motorized pump 8 and the revolution speed of the rotary drive motor 12 on the basis of detection values detected by the temperature sensor 9 and the room temperature sensor 9a.

In addition, a cooling water circuit 24a is provided to be connected to the cooling water circuit 24 in parallel with the air conditioner 25. An oil cooler 28 and a thermostat 29 are provided in the cooling water circuit 24a. The oil cooler 28 has an oil circulation path 28a for circulating oil with an automatic transmission 30, so as to perform heat exchange with oil in the automatic transmission 30. The thermostat 29 can change over the continuity of the cooling water circuit 24a from a disconnected state to a connected state, and vice versa. The thermostat 29 is set to connect the cooling water circuit 24a with the cooling water circuit 24 when the temperature of the cooling water is not lower than warming-up control temperature (e.g. 80° C.), and to close the cooling water circuit 24a when the temperature of the cooling water is lower than 80° C. Thus, with such a configuration, the automatic transmission oil is not cooled by the oil cooler 28 when the temperature of the cooling water is lower than the warming-up control temperature, and the automatic transmission oil is cooled when the temperature of the cooling water is not lower than 80° C.

In the engine 2, a cooling water circulation path 23 is formed to communicate with a cylinder head 21 and a cylinder block 22. The cooling water circuit 10 is connected to the cylinder head 21 side end portion of the cooling water circulation path 23 so as to communicate therewith. On the other hand, the cooling water circuit 3 is connected to the cylinder block 22 side end portion of the cooling water circulation path 23 so as to communicate therewith. That is, the cooling water delivered by the motorized pump 8 is set to be inputted to the cylinder head 21 side and outputted from the cylinder block 22 side.

In this embodiment, for example, a so-called vertical flow radiator in which a large number of tubes 6 are provided in parallel with one another between headers 4 and 5 disposed above and below at a distance is used as the radiator 7. However, a so-called horizontal flow radiator may be used. Incidentally, each tube 6 has a plate fin, a corrugated fin or the like suitably for heat exchange.

The cooling water circuit 3 connected to the end portion of the cooling water circulation path 23 in the cylinder block 22 is connected to the upper header 4 of the radiator 7. The electrically controllable thermostat 14 is put in the middle of the cooling water circuit 3, and set to change the ratio $W_R:W_B$ of a flow rate $W_R$ of the cooling water circulating through the cooling water circuit 3 to a flow rate $W_B$ of the cooling water circulating through the bypass circuit 13 gradually from 0:100 to 100:0 in accordance with the temperature of the cooling water when the temperature of the cooling water is, for example, in a range of from 100° C. to 105° C.

Incidentally, the thermostat 14 may be disposed in the middle of the cooling water circuit 10 connecting the lower header 5 and the engine 2 with each other, and set to change the ratio $W_K: W_B$ of a flow rate $W_k$ of the cooling water circulating through the cooling water circuit 10 to a flow rate $W_B$ of the cooling water circulating through the bypass circuit 13.

In addition, the rotary drive motor 12 to which the fan 11 for blowing the air to the tubes 6 of the radiator 7 is attached is connected to the control unit 15. The rotary drive motor 12 is designed so that the revolution speed of the rotary drive motor 12 is controlled in accordance with a revolution speed control signal Sr from the control unit 15.

The motorized pump 8 is designed to operate in accordance with a flow rate control signal Sv from the control unit 15 so as to change the flow rate of the cooling water.

The temperature sensor 9 is disposed to be able to detect the temperature near the terminal of the cooling water circulation path 23 in the cylinder block 22. Incidentally, although the detection end portion of the temperature sensor 9 is arranged to be inserted into the cylinder block 22 in the first embodiment, it may be arranged for detecting the temperature near the exit of the cooling water circulation path 23.

The control unit 15 controls the flow rate generated by the motorized pump 8, particularly the tube flow rate in the radiator 7, and the revolution speed of the rotary drive motor 12 for the fan 11. Particularly, the characteristic of the cooling water circulating through the tubes in the radiator 7 at the time of high load is specified to reduce the power loss. Thus, the fuel economy can be improved on a large scale.

Here, the relationship among the water-side Reynolds number in the radiator 7, the fan wind velocity and the power required for cooling will be described with reference to FIG. 2 before the description of the control/operation of the cooling apparatus 1 for the water-cooled type engine according to the first embodiment.

Figure 2:
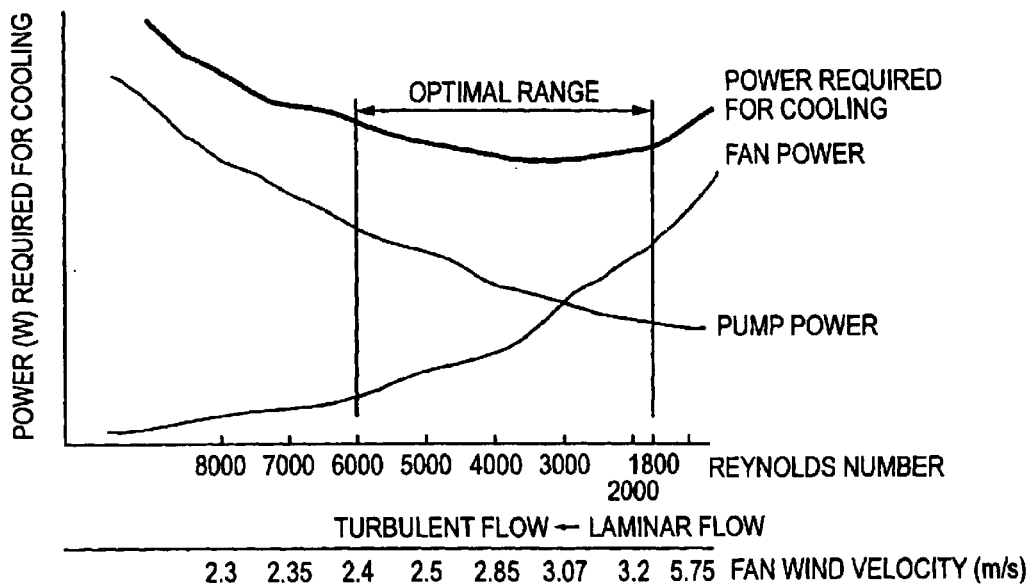
FIG. 2 is a graph showing the relationship among the power required for cooling, the radiator water-side Reynolds number and the fan wind velocity and the relationship between the fan power and the pump power according to the first embodiment of the invention.

The graph in FIG. 2 shows the power required for cooling in the condition of high load (the condition in which the cooling water is circulating through the radiator 7 with the cooling water temperature reaching 105° C.) in a typical vertical flow radiator 7 having a core portion (heat release portion) measuring 691.5 mm in width, 360 mm in height and 16 mm in depth. In FIG. 2, the abscissa designates the water-side Reynolds number in the radiator 7 and the fan wind velocity (m/sec), and the ordinate designates the power (W) required for cooling. As shown in FIG. 2, when the water-side Reynolds number in the radiator 7 is increased, the power of the motorized pump 8 increases correspondingly. When the fan wind velocity is increased, the fan power, that is, the power of the rotary drive motor 12 increases correspondingly.

The sum of the pump power and the fan power, that is, the power required for cooling becomes low when the water-side Reynolds number is between 1,800 and 6,000, as shown in FIG. 2. The area where the power required for cooling are low ranges over a transition zone where the liquidity of the cooling water circulating through the tubes 6 of the radiator 7 is between a laminar flow and a turbulent flow, and a turbulent flow zone close to such a transition zone. FIG. 2 shows the following fact in the condition of high load in such a radiator. That is, the motorized pump 8 is controlled so that the Reynolds number is in a range of from 1,800 to 6,000, and the fan 11 is controlled so that the wind velocity is in a range of from 2.8 m/sec to 3.3 m/sec. In such a manner, the power required for cooling can be suppressed to be low. At this time, the fuel economy becomes the best.

Incidentally, the performance of the radiator 7 is improved when improvement in the performance of the fin formed outside the tubes 6 is achieved and the wind volume is increased. However, when the water-side Reynolds number of the cooling water is so low that the cooling water is not a turbulent flow, the performance of cooling the cooling water is degraded extremely. It is therefore essential to use the cooling water in the form of a turbulent flow to the utmost.

Here, the optimal design for cooling will be described from the point of view of energy. In cooling an engine by means of a radiator, it is verified by the calculation of energy required for cooling whether the balance among the cooling water temperature, the fan wind volume and so on is optimal or not.

[Contribution Ratio of Water Volume/Wind Volume in Radiator Alone]

The heat release of a radiator can be obtained by the following expressions.

(Numerical Expression 1)

$$Q = \kappa A \Delta T$$

where Q designates the radiator heat release value (W), and κ designates the radiator overall heat transfer coefficient (W/mm²K).

The κ value (the radiator overall heat transfer coefficient) expressed to be substituted for the performance of the radiator is determined by the following components.

(Numerical Expression 2)

$$1/\kappa = 1/(\alpha w \cdot Aw/A) + d/(\lambda t \cdot Aw/A) + 1/\alpha a \cdot \eta a$$

(Numerical Expression 3)

$$1/\kappa = 11(\%) + 0.1(\%) + 88.9(\%)$$

Figure 3:
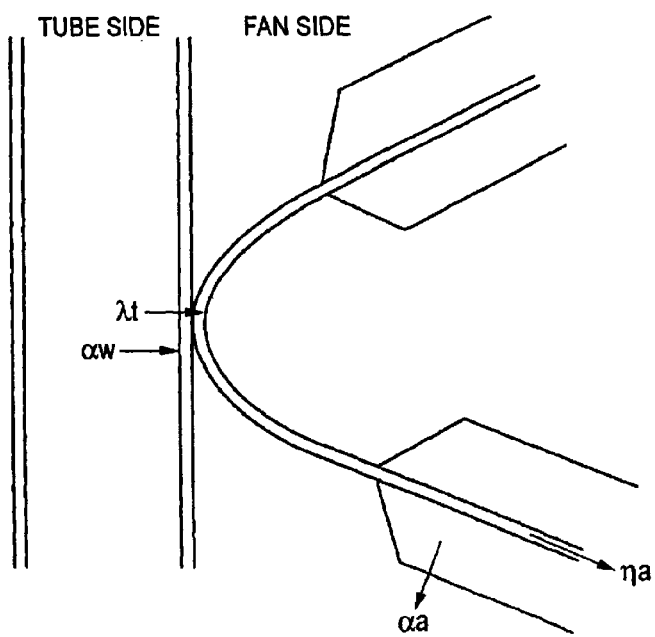
FIG. 3 is an explanatory view showing cooling water flowing through a tube and a heat transmission system.

Incidentally, as shown in FIG. 3, λt designates the tube conductivity (W/mK), αa designates the air-side thermal conductivity (W/m2K), αw designates the water-side thermal conductivity (W/m2K), ηa designates the fin combined efficiency (%), Aw designates the water-side heat release area (m²), A designates the air-side heat release area (mm²), and d designates the tube sheet thickness (mm). On the other hand, Numerical Expression 3 shows the contribution ratio of each term in Numerical Expression 2, calculated by use of a vertical flow radiator having a core portion (heat release portion) measuring 691.5 mm in width, 360 mm in height and 16 mm in depth, and 76 tubes, and in conditions of the flow rate of 40 liters/sec (Reynolds number 3,500) and the wind velocity of 3 m/sec.

Figure 4:
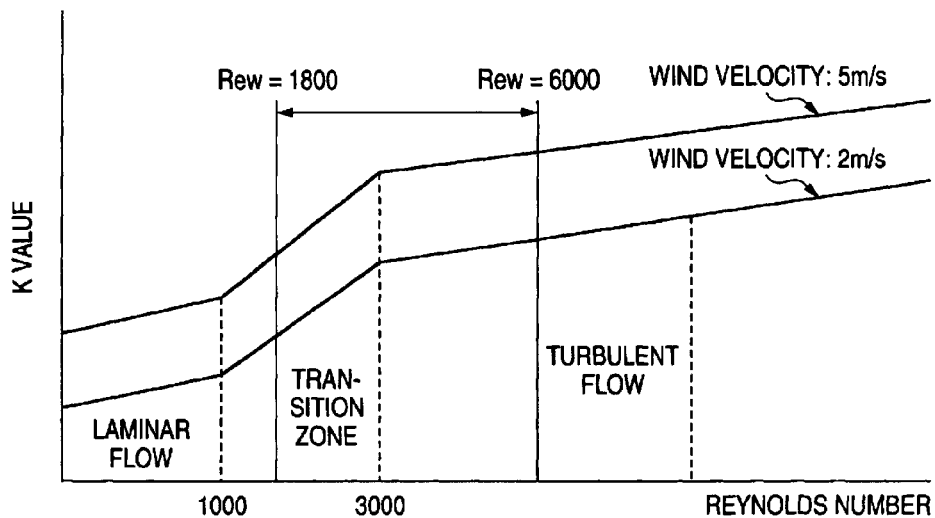
FIG. 4 is a graph showing the relationship among the K value, the water-side Reynolds number and the fan wind velocity.

The relationship between the K value and the water-side Reynolds number is shown in the graph of FIG. 4. FIG. 4 also shows the liquidity of the cooling water varying in accordance with the water-side Reynolds number. It is understood from FIG. 4 that the area where the power required for cooling is low in FIG. 2, that is, the area where the Reynolds number of the cooling water in the tubes is 1,800 to 6,000 ranges over a transition zone where the liquidity of the cooling water circulating through the tubes 6 of the radiator 7 is between a laminar flow and a turbulent flow, and a turbulent flow zone close to the transition zone.

As for the water-side and air-side contribution ratios to the performance in this state, the air-side contribution ratio (88.9%) is larger than the water-side contribution ratio (11%) as shown in Numerical Expression 3. Accordingly, when the required quantity of concurrent heating increases, the engine can be cooled with saved power if the wind volume of the (air side) fan is increased while the water volume is fixed. In such a manner, the Reynolds number of the cooling water is determined in a range with which the power required for cooling is optimized. Thus, the optimal control can be performed in various types of radiators. Incidentally, the invention is applicable to any heat exchanger (for a water-cooled type engine) including a heater core in any form in which cooling water circulates through tubes.

That is, the Reynolds number Re is expressed by DaG/μ ((equivalent diameter)×(mass velocity)/(viscosity coefficient)) wherein Da designates the equivalent diameter obtained by dividing the cross-sectional area of flow by the wetted perimeter (inside perimeter) and multiplying the quotient by 4, G designates the mass velocity of the cooling water, and μ designates the viscosity coefficient. When cooling waters have one and the same Reynolds number Re, the flows of the cooling waters become similar to each other mechanically so that the thermal conductivities of the cooling waters become equal to each other. Thus, when the Reynolds number of the cooling water circulating through various radiators 7 is controlled to be in a range of from 1, 800 to 6,000 as described above, the power (sum of pump power and fan power) required for cooling the engine 2 can be made the lowest. As a result, the power load can be relieved so that the fuel economy of the engine can be improved on a large scale.

[Optimal Energy Balance for Radiator Cooling]

Figure 5:
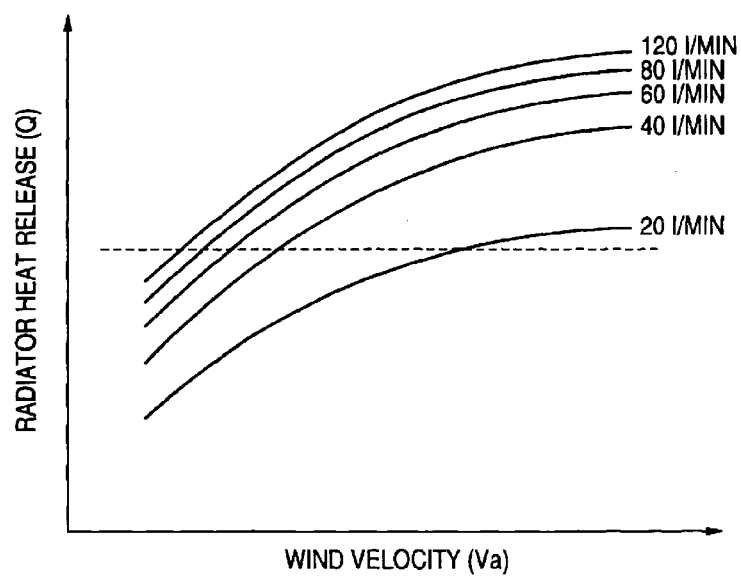
FIG. 5 is a graph showing the relationship between the radiator heat release and the fan wind velocity.

Next, the relationship among the radiator performance (radiator heat release Q), the wind volume (wind velocity Va) and the cooling water flow rate (Gw) is shown in the graph of FIG. 5, using a vertical flow radiator having a structure with a core portion (heat release portion) measuring 691.5 mm in width, 360 mm in height and 16 mm in depth in the same manner as the radiator 7. The abscissa designates the radiator heat release, and the ordinate designates the wind velocity. In addition, the following Table 1 shows combinations of wind velocities (Va) and cooling water flow rates (Gw) for obtaining the same performance (radiator heat release) (Q) with the same radiator. In such a manner, a combination of a wind velocity and a cooling water flow rate can be selected suitably to obtain the same radiator heat release 3.4×104 W.

TABLE 1

| Q(W) × 10⁴ | 3.4 | 3.4 | 3.4 | 3.4 | 3.4 | 3.4 | 3.4 |
|---|---|---|---|---|---|---|---|
| Va(m/s) | 2.40 | 2.42 | 2.52 | 2.66 | 2.78 | 3.08 | 5.1 |
| Gw(l/min) | 120 | 80 | 60 | 40 | 30 | 20 | 10 |

[Amount of Energy Required for Cooling]

Next, the following table shows a result of comparison of required energy obtained by applying theological power expressed by the following Expression 4 to both the air side and the cooling water side.

(Numerical Expression 4)

$$P = \rho g Q H$$

where P designates the power (W), ρ designates the fluid density (kg/m³), g designates the gravitational acceleration (m/s²), Q designates the flow rate (m³/s), and H designates the pressure difference (m)

TABLE 2

| required total power (W) | | 910W | 510W | 384W | 316W | 280W | 642W |
|---|---|---|---|---|---|---|---|
| Gw | W | 800 | 400 | 260 | 150 | 100 | 60 |
| | l/min | 120 | 80 | 60 | 40 | 30 | 20 |
| | Re | 1300 | 6900 | 5200 | 3500 | 2600 | 1700 |
| Va | W | 101 | 110 | 124 | 166 | 180 | 582 |
| | Va | 2.40 | 2.50 | 2.65 | 3.07 | 3.2 | 5.75 |

In Table 2, it can be confirmed that the required total power has a minimum of 280 W when the Reynolds number is 2,600 which is in the aforementioned range (1,800 to 6,000) of the Reynolds number minimizing the power required for cooling.

The air-side contribution ratio to the radiator performance is large while the water-side contribution ratio to the radiator performance is small. Therefore, when the flow rate of the cooling water is reduced while the wind volume is increased, the power required for cooling the engine can be reduced from the point of view of energy. However, it is not preferable that the flow rate of the cooling water is reduced so that the cooling water becomes within a laminar flow zone and the water-side performance is degraded extremely.

[Control Method in the First Embodiment]

Figure 6:
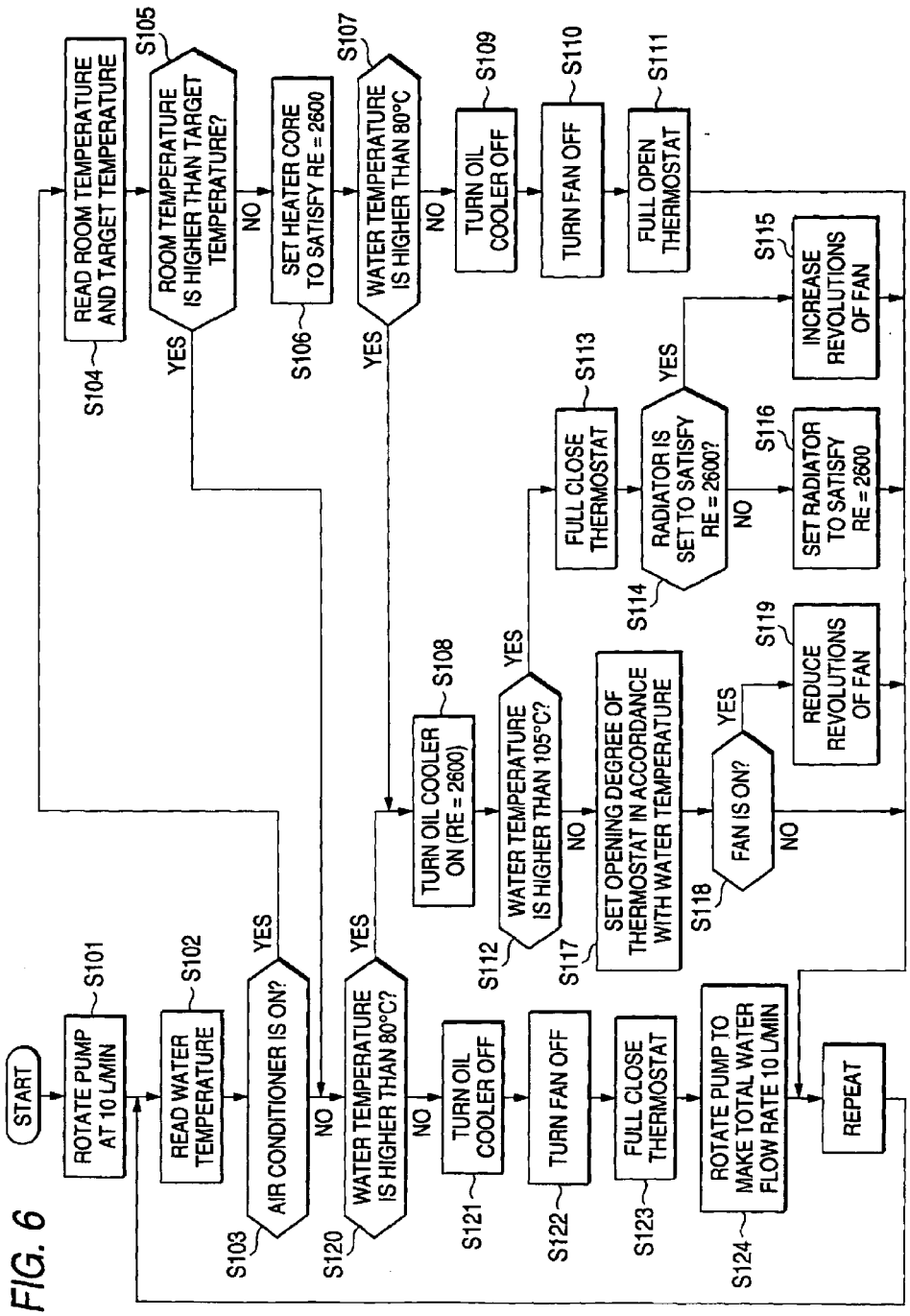
FIG. 6 is a flow chart showing the details of control according to the first embodiment of the invention.
Figure 7:
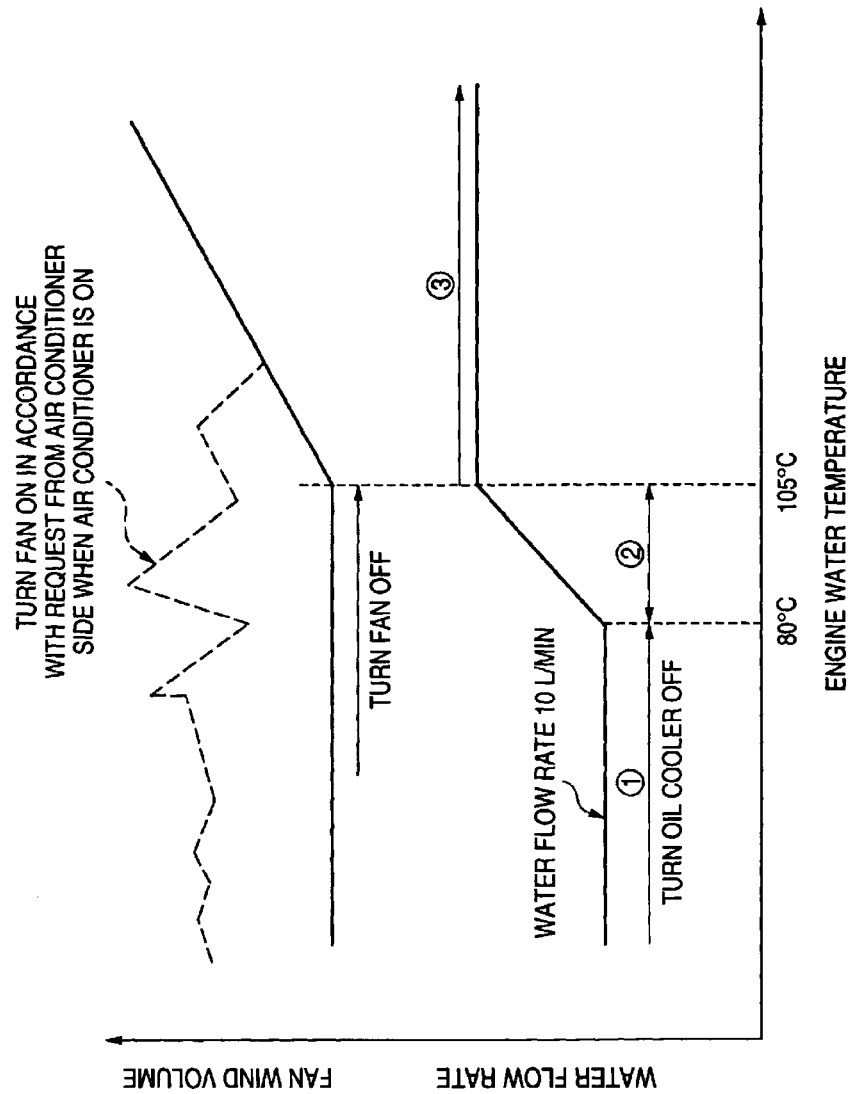
FIG. 7 is a graph showing the relationship among the engine water temperature, the fan wind volume and the water flow rate according to the first embodiment of the invention.

The control method and the operation of the cooling apparatus 1 for a water-cooled type engine will be described with reference to FIG. 6 showing the flow chart and FIG. 7 showing the relationship among the water temperature, the fan wind volume and the water flow rate. Incidentally, output data of the motorized pump 8 corresponding to water-side Reynolds numbers in an optimal range shown in FIG. 2 and output data of the rotary drive motor 12 corresponding to fan wind velocities likewise are stored in a not-shown memory portion provided in the control unit 15.

In Step S101, the motorized pump 8 is operated at a flow rate as low as possible but high enough to prevent the cooling water in the engine from boiling locally (hereinafter referred to as "lower-limit flow rate"), for example, at a flow rate of 10 1/min.

In Step S102, the water temperature detected by the temperature sensor 9 is read.

In Step S103, it is judged whether the air conditioner has been switched on or not. When the air conditioner has been switched on, the routine of processing advances to Step S104. When the air conditioner has not been switched on, the routine of processing jumps to Step S120.

In Step S104, the detection value detected by the room temperature sensor 9a and the set target temperature are read. The routine of processing advances to Step S105.

In Step S105, it is judged whether the read detection value of the room temperature sensor 9a is higher than the read target temperature or not. When the detection value is higher than the target temperature, the routine of processing jumps to Step S120. When the detection value is not higher than the target temperature, the routine of processing advances to Step S106.

In Step S106, the cooling water is poured into the heater core 26 so that the water-side Reynolds number in the tubes is 2,600. The routine of processing advances to Step S107.

In Step S107, it is judged whether the water temperature is higher than 80° C. or not. When the water temperature is higher than 80° C., the routine of processing advances to Step S108. When the water temperature is not higher than 80° C., the routine of processing jumps to Step S109.

In Step S108, the hot water is poured into the oil cooler 28. The routine of processing advances to Step S112. It is desired that the cooling-water-side Reynolds number is near 2,600 also in the oil cooler 28.

In Step S109, the cooling water is prevented from flowing into the oil cooler 28. The routine of processing advances to Step S110.

In Step S110, driving of the fan 11 is stopped.

In Step S111, the cooling water circuit 3 is full closed in the thermostat 14, and the bypass circuit 13 is full opened therein.

In Step S112, it is judged whether the water temperature is higher than 105° C. or not. When the water temperature is higher than 105° C., the routine of processing advances to Step S113. When the water temperature is not higher than 105° C., the routine of processing jumps to Step S117.

In Step S113, the cooling water circuit 3 is full opened in the thermostat 14, and the bypass circuit 13 is full closed therein. The routine of processing advances to Step S114.

In Step S114, it is judged whether the motorized pump 8 is driven so that the water-side Reynolds number in the radiator 7 is 2, 600 or not. When the motorized pump 8 is driven in such a manner, the routine of processing advances to Step S115. When the motorized pump 8 is not driven in such a manner, the routine of processing jumps to Step S116.

In Step S115, the drive quantity of the fan 11 is increased.

In Step S116, the motorized pump 8 is driven so that the water-side Reynolds number in the radiator 7 is 2,600.

In Step S117, the thermostat 14 distributes the cooling water so that the ratio $W_R:R_B$ of the flow rate $W_R$ of the cooling water distributed into the cooling water circuit 3 to the flow rate $W_B$ of the cooling water distributed into the bypass circuit 13 is varied gradually from 0:100 to 100:0 in accordance with the cooling water temperature.

That is, immediately after the start of the engine, the motorized pump 8 is driven at a flow rate of 10 1/min (corresponding to the section (1) in FIG. 7). At this time, circulation of the cooling water through the oil cooler 28 is forbidden. Then, the cooling water flows into the cooling water circulation path 23 in the cylinder head 21 and the cylinder block 22. With this circulation, the temperature sensor 9 starts to detect the temperature in the cooling water circulation path 23 in the cylinder block 22. The thermostat 14 distributes the cooling water to the bypass circuit 13 so as to circulate the cooling water bypassing the radiator 7 till the temperature of the circulating cooling water reaches, for example, 100° C.

Next, it is judged whether the air conditioner has been switched on or not. Here, when the air conditioner has not been switched on, it is judged whether the temperature value detected by the temperature sensor 9 is higher than 80° C. or not. When it is concluded that the cooling water temperature is higher than 80° C., the hot water is poured into the oil cooler (corresponding to the section (2) in FIG. 7).

On the other hand, it is judged in Step S105 whether the temperature in the cabin is higher than the target temperature of the air conditioner 25 or not. Then, when the temperature in the cabin is lower than the target temperature, the motorized pump 8 is driven so that the Reynolds number of the hot water circulating through the tubes of the heater core 26 is 2,600.

When the temperature of the cooling water going out of the cylinder block 22 increases to 80° C. with the operation of the engine 2, the thermostat 29 opens the cooling water circuit 24a so as to distribute the cooling water to the oil cooler 28 (corresponding to the section (2) in FIG. 7).

Next, when the cooling water temperature is lower than 105° C. in Step S112, the thermostat 14 distributes the cooling water while varying the ratio of the flow rate $W_R$ of the cooling water distributed to the cooling water circuit 3 to the flow rate $W_S$ of the cooling water distributed to the bypass circuit 13 gradually in accordance with the cooling water temperature.

At this time, when the temperature detected by the temperature sensor 9 does not reach 105° C. that is the predetermined target temperature, there is typically a situation that the rotary drive motor 12 is not driven and the fan 11 is not rotated, while the cooling water passing through the tubes 6 performs only heat exchange with the outdoor air outside the running vehicle. It is judged in Step S118 whether the fan 11 is driven or not. When the fan 11 is not driven, detection of the cooling water temperature is kept. On the other hand, when the fan 11 is driven, detection of the cooling water temperature is kept while the revolution speed of the fan 11 is controlled to be low enough to allow the cooling water temperature in the cooling water circulation path 23 in the cylinder block 22 to reach 105° C.

The cooling water going out of the header 5 is delivered to the cooling water circulation path 23 in the cylinder head 21 through the motorized pump 8 and the cooling water circuit 10. Incidentally, when the air conditioner 25 is in operation, the fan wind volume corresponding to a request from the air conditioner 25 side may be produced.

On the other hand, when the cooling water temperature, that is, the temperature detected by the temperature sensor 9 is higher than 105° C., the thermostat 14 full closes the bypass circuit 13 and full opens the cooling water circuit 3 so as to distribute the cooling water to the radiator 7.

Then, in Step S114, it is judged whether the motorized pump 8 is driven so that the water-side Reynolds number in the tubes 6 is 2,600. When the water-side Reynolds number is 2,600, the control unit supplies the revolution speed control signal Sr to the rotary drive motor 12 and controls the rotary drive motor 12 to increase the revolutions of the fan 11 so that the cooling water temperature in the cooling water circulation path 23 in the cylinder block 22 is 105° C. On the other hand, when the water-side Reynolds number is not 2,600, control is made to drive the motorized pump 8 so that the water-side Reynolds number is 2,600, while detection of the cooling water temperature in the temperature sensor 9 is kept (corresponding to the section (3) in FIG. 7).

[Operation and Effect of the First Embodiment]

In the water-cooled type engine cooling apparatus according to the first embodiment, control is made as follows. That is, circulation of the cooling water through the oil cooler 28 is stopped by the thermostat 29 when the water temperature detected by the temperature sensor 9 is lower than a preset temperature (for example, 80° C.), which is set in advance. When the water temperature is not lower than the preset temperature (80° C.), the cooling water is circulated through the oil cooler 28 by the thermostat 29. That is, when the water temperature is lower than the preset temperature, the water temperature is urged to increase to warming-up control temperature so that the engine is operated at a temperature as high as possible. Thus, the friction loss of the engine itself is reduced while the increase control time of fuel oil consumption is shortened. As a result, the improvement in fuel economy obtained thus surpasses the improvement in fuel economy due to the oil cooler 28 increasing the temperature of hydraulic oil for an automatic transmission 30. Particularly, it is possible to improve fuel economy at engine start time.

In addition, when the air conditioner has been switched on and the room temperature is lower than target temperature, circulation of the cooling water through the oil cooler 28 is stopped.

That is, in an environment such as winter, in which the outdoor air temperature is very low, the difference between the target temperature in the cabin set by a passenger and the outdoor air temperature is large. As a result, when heating of the hydraulic oil and conditioning of the air are performed simultaneously, increase in the energy used for heating the hydraulic oil results in reduction in the heating performance of the air conditioner. Thus, it takes much time to attain the target temperature. However, when the cooling water temperature is lower than 80° C., the operation of the oil cooler is forbidden till the target temperature is attained. In such a manner, there is no fear that the heating performance of the air conditioner is degraded. Thus, stable air conditioning can be attained.

Further, an air conditioner may be provided for circulating the cooling water through tubes. In this configuration, the motorized pump 8 is controlled so that the liquidity of the cooling water in the tubes is in a range including at least one of a transition zone between a laminar flow zone and a turbulent flow zone and a turbulent flow zone close to the transition zone. That is, the heat exchange effectiveness of the air conditioner is enhanced so that the time required for attaining the target temperature can be shortened.

[Second Embodiment]

Figure 8:
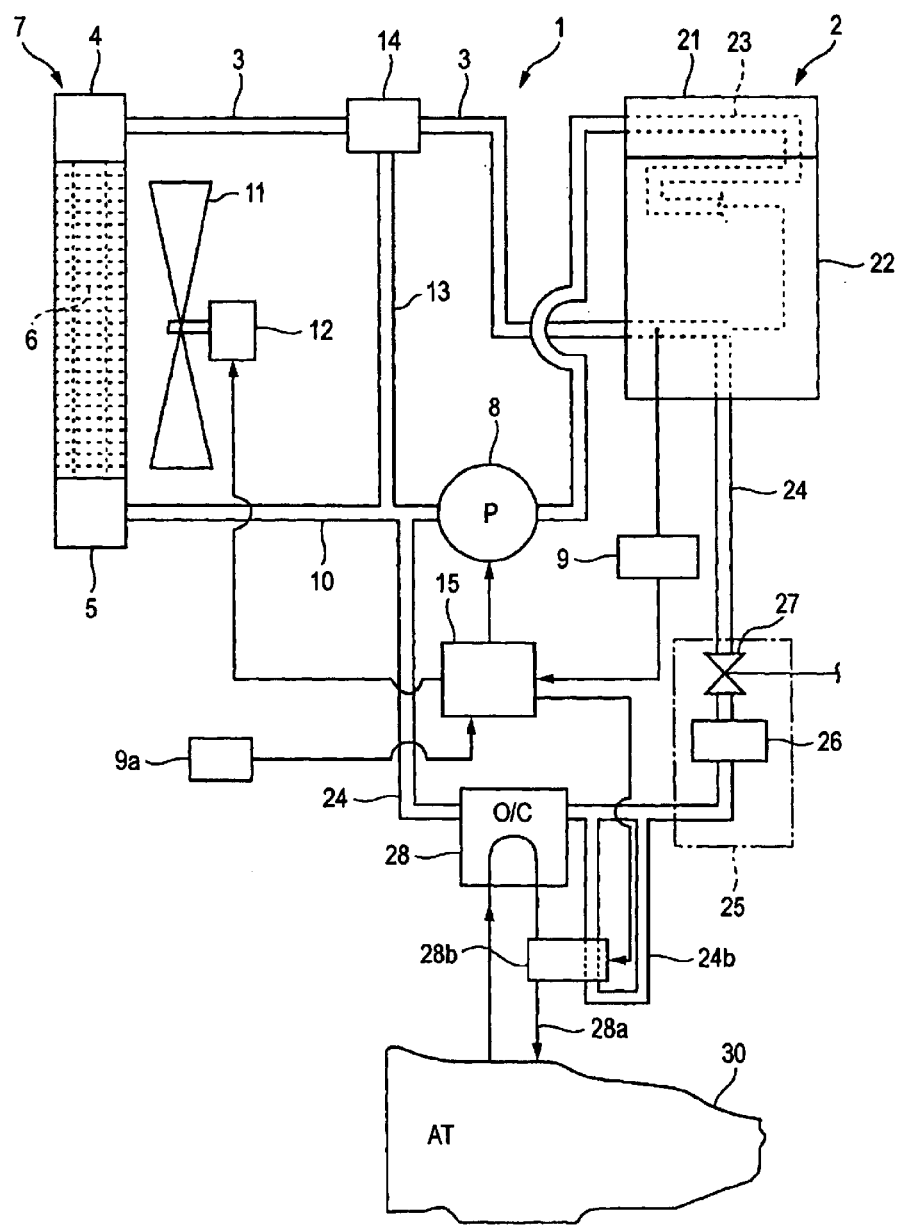
FIG. 8 is a schematic explanatory view showing a water-cooled type engine cooling system according to the second embodiment of the invention.

FIG. 8 is an explanatory view showing a cooling apparatus for a water-cooled type engine according to a second embodiment of the invention. The fundamental configuration in the second embodiment is similar to that in the first embodiment. Therefore, the description of the second embodiment hereinafter will be made only about those that differ from the first embodiment.

A thermostat 28b for changing over the circulating state of oil is provided on an oil circulation path 28a for circulating the oil between an automatic transmission 30 and an oil cooler 28. In addition, a thermostat circulation path 24b through which distributed cooling water circulates is provided in a hot water circulation path 24 so as to be connected to the thermostat 28b.

The thermostat 28b changes over the circulating state of the oil so as to allow the oil to circulate through the oil cooler 28 when the cooling water temperature in the thermostat circulation path 24b is not lower than 80° C. In such a manner, the operating state of the oil cooler 28 may be changed over by changing over the circulation of the oil circulating through the oil cooler 28. Thus, the operation and effect similar to those in the first embodiment can be obtained.

[Third Embodiment]

Figure 9:
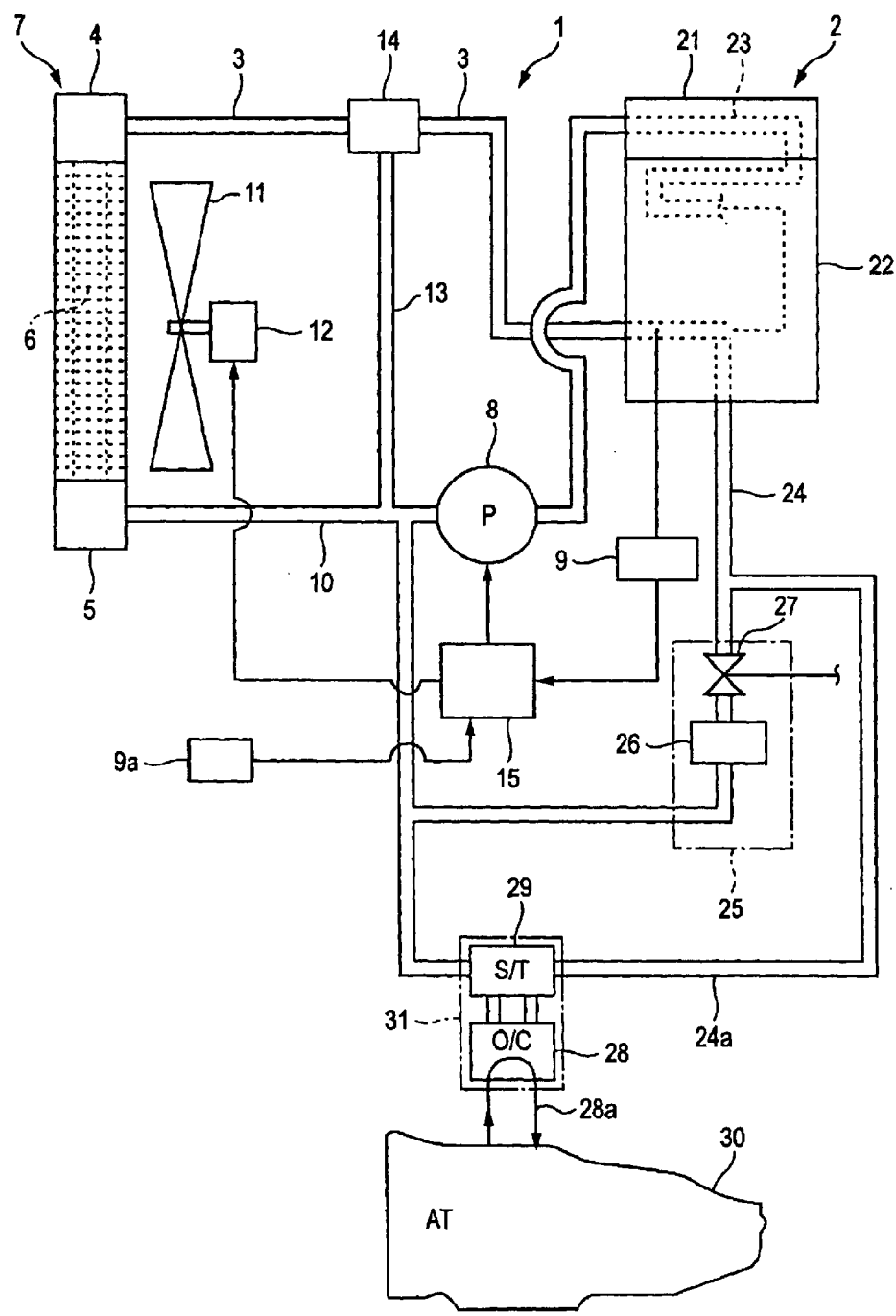
FIG. 9 is a schematic explanatory view showing a water-cooled type engine cooling system to which an oil cooler module according to the third embodiment of the invention has been applied.

FIG. 9 is an explanatory view showing a water-cooled type engine cooling apparatus to which a transmission oil cooler module according to a third embodiment of the invention has been applied. The fundamental configuration in the third embodiment is similar to that in the first embodiment. Therefore, the description of the third embodiment hereinafter will be made only about those that differ from the first embodiment.

In the cooling apparatus 1 of the third embodiment, as shown in FIG. 9, an oil cooler module 31 is provided in the cooling water circuit 24a. The oil cooler module 31 has an oil cooler 28 and a thermostat 29 formed integrally. The oil cooler 28 has an oil circulation path 28a through which oil is circulated between an automatic transmission 30 and the oil cooler 28. The oil cooler 28 performs heat exchange with the oil in the automatic transmission 30. The thermostat 29 can change over the continuity of the cooling water circuit 24a from a disconnected state to a connected state, and vice versa. The oil cooler module 31 is set to permit the cooling water to circulate through the oil cooler 28 when the temperature of the cooling water is not lower than the warming-up control temperature (for example, 80° C.), and forbids the cooling water to circulate through the oil cooler 28 when the temperature of the cooling water is lower than the warming-up control temperature. Accordingly, the automatic transmission oil is not cooled by the oil cooler 28 when the temperature of the cooling water is lower than 80° C. The automatic transmission oil is cooled by the oil cooler 28 when the temperature of the cooling water is not lower than 80° C.

Figure 10:
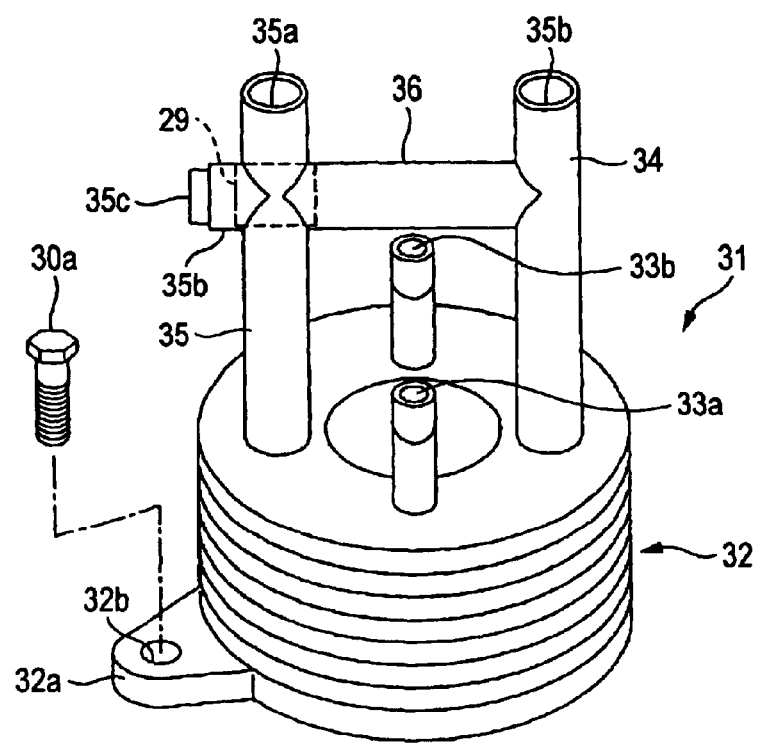
FIG. 10 is a perspective view showing the oil cooler module according to the third embodiment.

FIG. 10 is a perspective view showing the oil cooler module 31.

In FIG. 10, the reference numeral 32 represents an oil cooler body, which is formed out of a plurality of plates laminated to one another. A flange portion 32a in which a bolt hole 32b is formed is provided in the lower portion of the oil cooler body 32 so as to project thereon. The flange portion 32a is fixed to the vicinity of the automatic transmission 30 by a mounting bolt 30a.

An oil inlet 33a, an oil outlet 33b, an introduction pipe 34 and a discharge pipe 35 are provided in the top surface of the oil cooler body 32 so as to project thereon. The automatic transmission oil flows into the oil cooler body 32 through the oil inlet 33a and flows out of the oil cooler body 32 through the oil outlet 33b. The cooling water is introduced from the cooling water circuit 24a into the oil cooler body 32 through the introduction pipe 34 and discharged to the cooling water circuit 24a through the discharge pipe 35. These members are formed integrally with the oil cooler body 32. Incidentally, a cooling water introduction port 34a is opened at the upper end of the introduction pipe 34, and a cooling water discharge port 35a is opened at the upper end of the discharge pipe 35.

A bypass pipe 36 for making the cooling water bypass the oil cooler body 32 is formed integrally between the introduction pipe 34 and the discharge pipe 35. In addition, a thermostat mounting hole 35b is formed in the portion where the bypass pipe 36 joins the discharge pipe 35. The thermostat 29 is inserted into the discharge pipe 35 through the thermostat mounting hole 35b, which is designed to be then closed by a fixing threaded cap 35c.

Figure 11A:
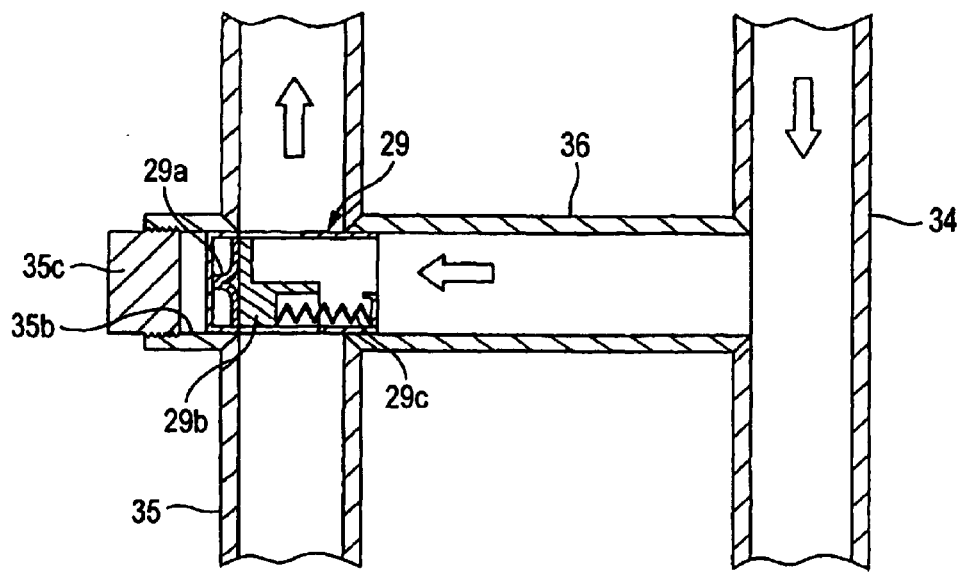
FIGS. 11A and 11B are longitudinal sectional views showing the main portion of the oil cooler module.
Figure 11B:
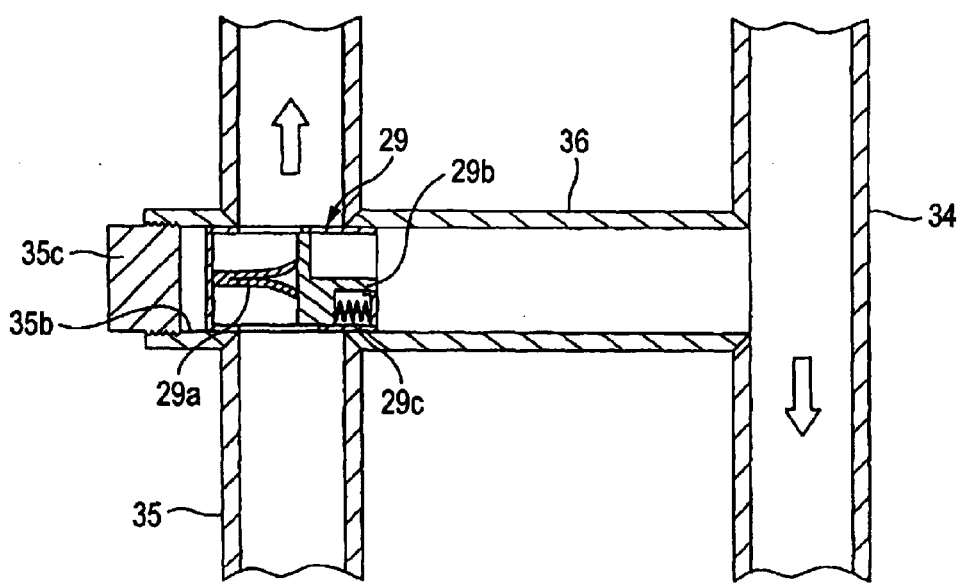

Next, the structure of the thermostat 29 will be described with reference to FIGS. 11A and 11B.

For example, the thermostat 29 has a structure in which a slide type change-over valve 29b is switched by a shape-memory resin 29a deformable in response to predetermined temperature, for example, 80° C., and a spring 29c. The change-over valve 29b uses the spring 29c to open the bypass pipe 36 and close the discharge valve 35 as shown in FIG. 11A when the temperature of the shape memory resin 29a is lower than 80° C.

When the temperature of the shape memory resin 29a is not lower than 80° C., the shape memory resin 29a deforms against the urging force of the spring 29c so as to switch the change-over valve 29b to a state in which the change-over valve 29b closes the bypass pipe 36 and opens the discharge pipe 35, as shown in FIG. 1B. Then, when the temperature of the shape memory resin 29a is lower than 80° C. again, the shape memory resin 29a deforms so that the change-over valve 29b restores the state of FIG. 11A by the urging force of the spring 29c.

In addition, in the oil cooler module 31, the introduction pipe 34, the discharge pipe 35 and the bypass pipe 36 are formed integrally with the oil cooler body 32 covering the oil cooler 28. The thermostat 29 is inserted and mounted into the discharge pipe 35 through the thermostat mounting hole 35b of the discharge pipe 35.

Accordingly, only when the thermostat 29 is inserted into the discharge pipe 35 through the thermostat mounting hole 35b of the discharge pipe 35 and the thermostat mounting hole 35b is covered with the fixing threaded cap 35c while the flange portion 32a of the oil cooler body 32 is fastened by the mounting bolt 30a, the installation of the oil cooler module 31 into an automatic transmission housing is completed. Thus, in comparison with related-art products, the number of man hours for installation can be reduced so that the cost can be reduced.

[Other Embodiments]

Although the flow rate of the cooling water was controlled by use of a single motorized pump in the above described embodiments, a water pump driven by a internal-combustion engine may be used instead of the motorized pump 8, or both the motorized pump and the water pump may be used. The object of the invention can be attained also in such a configuration.

In addition, although the above described embodiments have shown an example in which the preset temperature was previously set at 80° C., the invention is not limited to such configuration. The preset temperature may be set to be not lower than predetermined temperature (warming-up control temperature) used for increase control of fuel oil consumption at engine start time.

Further, although the above described embodiments have shown an example in which the thermostat 14 was set to vary the flow rate ratio gradually from 0:100 to 100:0 in accordance with the cooling water temperature when the cooling water temperature was in a range of from 100° C. to 105° C., the invention is not limited to such configuration. The preset temperature may be changed in accordance with the properties of the engine, or the preset temperature may be made variable in accordance with the loading state of the engine.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A water-cooled type engine cooling apparatus comprising:
   an oil cooler adapted to circulate cooling water flowing out of a water-cooled type engine so as to regulate temperature of hydraulic oil for an automatic transmission by exchanging heat of the hydraulic oil with heat of the cooling water;
   a water temperature detection unit adapted to detect temperature of the cooling water;
   a switching unit capable of switching the oil cooler from an operating state, where the cooling water circulates through an oil cooler body of the oil cooler, to a halt state, where the cooling water is prevented from circulating through the oil cooler body, and vice versa; and
   a switching control unit adapted to control switching of the switching unit;
   wherein the switching control unit controls the switching unit to switch the oil cooler into the halt state when the temperature detected by the water temperature detection unit is lower than a preset temperature, and controls the switching unit to switch the oil cooler into the operating state when the temperature detected by the water temperature detection unit is not lower than the preset temperature.

2. The cooling apparatus as claimed in claim 1,
   wherein the switching control unit controls the switching unit by outputting a command that indicates the switching of the oil cooler.

3. The cooling apparatus as claimed in claim 1,
   wherein the switching unit comprises a cooling water change-over valve adapted to halt circulating the cooling water through the oil cooler.

4. The cooling apparatus as claimed in claim 1,
   wherein the switching unit comprises a thermostat adapted to automatically change over when the temperature detected by the water temperature detection unit reaches the preset temperature.

5. The cooling apparatus as claimed in claim 4, further comprising:
   a hydraulic oil circulation path provided for circulating the hydraulic oil through said oil cooler;
   a hydraulic oil change-over valve including the thermostat and provided on the hydraulic oil circulation path; and
   a water temperature supply path provided for supplying water temperature of the cooling water to the thermostat included in the hydraulic oil change-over valve;
   wherein the switching control unit changes over circulation of the hydraulic oil through the oil cooler in accordance with the water temperature supplied from the water temperature supply path.

6. A water-cooled type engine cooling apparatus comprising:
   an oil cooler adapted to circulate cooling water flowing out of a water-cooled type engine so as to regulate temperature of hydraulic oil for an automatic transmission by exchanging heat of the hydraulic oil with heat of the cooling water;
   a water temperature detection unit adapted to detect temperature of the cooling water;
   a switching unit capable of switching the oil cooler from an operating state to a halt state, and vice versa; and
   a switching control unit adapted to control switching of the switching unit;

wherein the switching control unit controls the switching unit to switch the oil cooler into the halt state when the temperature detected by the water temperature detection unit is lower than a preset temperature, and controls the switching unit to switch the oil cooler into the operating state when the temperature detected by the water temperature detection unit is not lower than the preset temperature;

an air conditioning unit adapted to condition air in a cabin of a vehicle into a target temperature by circulating the cooling water through a tube and by exchanging heat of the air with heat of the cooling water;

a circulation unit adapted to circulate the cooling water through the tube in variable flow characteristic;

a control unit adapted to control the circulation unit to thereby control the flow characteristic of the cooling water in the tube; and a room temperature detection unit adapted to detect temperature in the cabin;

wherein the control unit controls the circulation unit to set the flow characteristic of the cooling water within a range including at least one of a transition zone between a laminar flow zone and a turbulent flow zone or a turbulent flow zone adjacent to the transition zone, when the temperature detected by the room temperature detection unit is lower than said the target temperature.

7. A water-cooled type engine cooling apparatus comprising:

an oil cooler adapted to circulate cooling water flowing out of a water-cooled type engine so as to regulate temperature of hydraulic oil for an automatic transmission by exchanging heat of the hydraulic oil with heat of the cooling water;

a water temperature detection unit adapted to detect temperature of the cooling water;

a switching unit capable of switching the oil cooler from an operating state to a halt state, and vice versa; and a switching control unit adapted to control switching of the switching unit;

wherein the switching control unit controls the switching unit to switch the oil cooler into the halt state when the temperature detected by the water temperature detection unit is lower than a preset temperature, and controls the switching unit to switch the oil cooler into the operating state when the temperature detected by the water temperature detection unit is not lower than the preset temperature, wherein the switching unit comprises a hydraulic oil change-over valve adapted to halt circulating the hydraulic oil through the oil cooler.

8. A transmission oil cooler module for regulating temperature of hydraulic oil for a transmission by exchanging heat of the hydraulic oil with heat of the cooling water flowing out of a water-cooled type engine, comprising:

an oil cooler body adapted to circulate the hydraulic oil for the transmission;

an introduction path adapted to introduce the cooling water into the oil cooler body separately from the hydraulic oil in a manner that the cooling water can exchange heat with the hydraulic oil;

a discharge path adapted to discharge the cooling water to an outside of the oil cooler body;

a bypass connecting the introduction path and the discharge path with each other and adapted to bypass the cooling water onto the oil cooler body;

a water temperature detection unit adapted to detect water temperature of the cooling water;

a switching unit capable of switching from a mode allowing the cooling water to circulate through the oil cooler body to a mode allowing the cooling water to bypass the oil cooler body through the bypass, and vice versa; and a switching control unit adapted to control switching of the switching unit;

wherein the introduction path, the discharge path and the bypass are formed integrally with the oil cooler body, wherein the water temperature detection unit, the switching control unit and the switching unit are provided in an inside of one of the introduction path, the discharge path or the bypass, and wherein the switching control unit controls the switching unit to switch into a halt state where the cooling water circulation is halted through the oil cooler body when the water temperature detected by the water temperature detection unit is lower than a preset temperature, and controls the switching unit to switch into an operating state where the cooling water circulates through the oil cooler body when the water temperature detected by the water temperature detection unit is not lower than the preset temperature.

9. The transmission oil cooler module as claimed in claim 8, wherein the switching control unit controls the switching unit by outputting a command that indicates the switching.

10. The transmission oil cooler module as claimed in claim 8, wherein the switching unit comprises a change-over valve located in a portion where one of the introduction path or the discharge path joins the bypass, so as to open the bypass while closing one of the introduction path or the discharge path when the water temperature detected by the water temperature detection unit is lower than the preset temperature, and so as to close the bypass while opening one of the introduction path or the discharge path when the water temperature detected by the water detection unit is not lower than the preset temperature.

11. The transmission oil cooler module as claimed in claim 8, wherein the water temperature detection unit, the switching control unit and the switching unit are formed as a slide type change-over valve using a thermostat for changing over when the water temperature detected by the water temperature detecting unit reaches the preset temperature.

12. The transmission oil cooler module as claimed in claim 8, wherein the introduction path, the discharge path and the bypass are made of pipes projecting out from the oil cooler body.

* * * * *